(12) United States Patent
Brundridge et al.

(10) Patent No.: US 7,831,843 B2
(45) Date of Patent: Nov. 9, 2010

(54) APPARATUS AND METHODS FOR MANAGING POWER IN AN INFORMATION HANDLING SYSTEM

(75) Inventors: Michael A. Brundridge, Georgetown, TX (US); Alan Brumley, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 807 days.

(21) Appl. No.: 11/535,067

(22) Filed: Sep. 26, 2006

(65) Prior Publication Data

US 2008/0077817 A1 Mar. 27, 2008

(51) Int. Cl.
G06F 1/00 (2006.01)
G06F 11/30 (2006.01)

(52) U.S. Cl. .................. 713/300; 713/340; 307/29; 307/140

(58) Field of Classification Search .............. 713/300, 713/340; 307/29, 140
See application file for complete search history.

(56) References Cited

U.S. PATENT DOCUMENTS

| | | | |
|---|---|---|---|
| 4,819,180 A * | 4/1989 | Hedman et al. | 700/291 |
| 5,483,656 A * | 1/1996 | Oprescu et al. | 713/320 |
| 5,528,132 A | 6/1996 | Doluca | |
| 5,747,889 A | 5/1998 | Raynham et al. | |
| 5,867,377 A | 2/1999 | Suranyi | |
| 6,605,930 B2 | 8/2003 | Hwang | |
| 6,614,133 B2 | 9/2003 | Belson et al. | |
| 6,625,736 B1 * | 9/2003 | Berthaud et al. | 713/300 |
| 7,046,524 B2 | 5/2006 | Hoffman et al. | |
| 7,363,520 B1 * | 4/2008 | Maier et al. | 713/300 |
| 2003/0056125 A1 * | 3/2003 | O'Conner et al. | 713/300 |
| 2003/0065958 A1 * | 4/2003 | Hansen et al. | 713/300 |
| 2003/0080624 A1 | 5/2003 | Belson et al. | |
| 2004/0073816 A1 * | 4/2004 | Hansen | 713/300 |
| 2004/0163001 A1 * | 8/2004 | Bodas | 713/300 |
| 2005/0028017 A1 * | 2/2005 | Janakiraman et al. | 713/340 |
| 2005/0067902 A1 * | 3/2005 | Bemat et al. | 307/140 |
| 2006/0063509 A1 * | 3/2006 | Pincu et al. | 455/402 |
| 2006/0082222 A1 * | 4/2006 | Pincu et al. | 307/29 |
| 2006/0149978 A1 * | 7/2006 | Randall et al. | 713/300 |
| 2007/0191076 A1 * | 8/2007 | Hageman et al. | 455/574 |
| 2007/0245161 A1 * | 10/2007 | Shaw et al. | 713/300 |
| 2007/0260897 A1 * | 11/2007 | Cochran et al. | 713/300 |
| 2008/0052546 A1 * | 2/2008 | Schindler et al. | 713/300 |

* cited by examiner

*Primary Examiner*—Vincent T Tran
(74) *Attorney, Agent, or Firm*—Garrana Tran, LLP

(57) ABSTRACT

A method of controlling power supplies in an information handling system, comprising measuring a power consumption of each of a plurality of electrical devices in the information handling system and adjusting a number of operating power supplies based at least in part on the measured power consumption of each of the plurality of electrical devices.

14 Claims, 3 Drawing Sheets

APPARATUS AND METHODS FOR MANAGING POWER IN AN INFORMATION HANDLING SYSTEM

BACKGROUND

1. Technical Field

This disclosure relates generally to apparatus and methods in the field of information handling systems.

2. Background Information

As the value and use of information continues to increase, individuals and businesses seek additional ways to process and store information. One option available is an information handling system (IHS). An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking system.

SUMMARY

The following presents a general summary of several aspects of the disclosure in order to provide a basic understanding of at least some facets of the disclosure. This summary is not an extensive overview of the disclosure. It is not intended to identify key or critical elements of the disclosure or to limit the scope of the claims. The following summary merely presents some concepts of the disclosure in a general form as a prelude to the more detailed description that follows.

In one aspect, a method of controlling power supplies in an information handling system comprises measuring a power consumption of each of a plurality of electrical devices in the information handling system. The number of operating power supplies is adjusted based at least in part on the measured power consumption of each of the plurality of electrical devices.

In another aspects an information handling system comprises a plurality of electrical devices. A plurality of power supplies is electrically coupled to the plurality of electrical devices. An electrical power sensor acts cooperatively with each of the plurality of electrical devices to measure a power consumption by each of the plurality of electrical devices. A set of instructions is stored in a memory in the information handling system that when executed by a processor adjusts a number of operating power supplies based at least in part on the measured power consumption of each of the plurality of electrical devices.

In yet another aspect, a computer readable medium contains a set of executable instructions that when executed by an information handling system performs a method of controlling power supplies in the information handling system. The method comprises measuring a power consumption of each of a plurality of electrical devices in the information handling system. The number of operating power supplies is adjusted based at least in part on the measured power consumption of each of the plurality of electrical devices.

Another aspect of the present disclosure provides a method of controlling power supplies in an information handling system (IHS). The method includes receiving a power request from a first electrical device in the IHS, the IHS having a number of operating power supplies. The method also includes determining if there is sufficient power to satisfy the power request and determining an excess power supplied to the IHS. The excess power is the difference between an amount of power allocated to a plurality of electrical devices in the IHS versus an amount of power consumed by the plurality of electrical devices. Finally, the method also includes providing power to the first electrical device using only the number of operating power supplies if the excess power can satisfy the power request.

Yet another aspect of the present disclosure provides for an information handling system (IHS), comprising a plurality of electrical devices. The IHS also includes a number of power supplies electrically coupled to the plurality of electrical devices. Furthermore, the IHS includes a chassis management controller coupled to the plurality of electrical devices and the number of operating power supplies, whereupon receiving a power request from a requesting device the chassis management controller is configured to determine if there is sufficient power to satisfy the power request. Additionally, the chassis management controller is also configured to determine an excess power supplied to the plurality of electrical devices, wherein the excess power is the difference between an amount of power allocated to the plurality of electrical devices compared to an amount of power consumed by the plurality of electrical devices. Finally, the chassis management controller is configured to direct only the number of operating power supplies to provide power the requesting device if the excess power can satisfy the power request.

A further aspect of the present disclosure provides for a computer readable medium containing a set of executable instructions that when executed by an information handling system performs a method of controlling power supplies in the information handling system (IHS). The method includes supplying power to the IHS via a number of operating power supplies and powering off a device, the device associated with an amount of allocated power. The method further includes adding the amount of allocated power back to an IHS power budget and deactivating one of the number of operating power supplies to increase efficiency of the number of operating power supplies.

BRIEF DESCRIPTION OF THE DRAWINGS

For detailed understanding of the illustrative embodiments, reference should be made to the following detailed description, taken in conjunction with the accompanying drawings, in which like elements have been given like numerals, wherein.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may comprise a personal computer, a network storage device, a network server, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more communication buses operable to transmit communications between the various hardware components.

Electronic equipment requires a source of electrical power. Input power, which may be AC power and/or DC power may be converted to at least one DC voltage at a level usable by the electronic equipment, in large electronic systems, for example, computer server systems with multiple power supplies with outputs in parallel may be used. In addition, redundant power supplies may be used to ensure continuous operation even with the failure of one or more power supplies.

The efficiency of power supplies commonly used in server applications changes as a function of the amount of power supplied, with best efficiency at or near the maximum rated working load of the power supply. When a power supply is not operating at or near its maximum efficiency, it is wasting energy, and is less cost efficient to operate. Cost of power may become a large portion of an operating budget for such equipment. In addition, the operation of power supplies at less than there peak efficiency may result in additional heat generation within the electronic system that must be eliminated.

Figure 1:
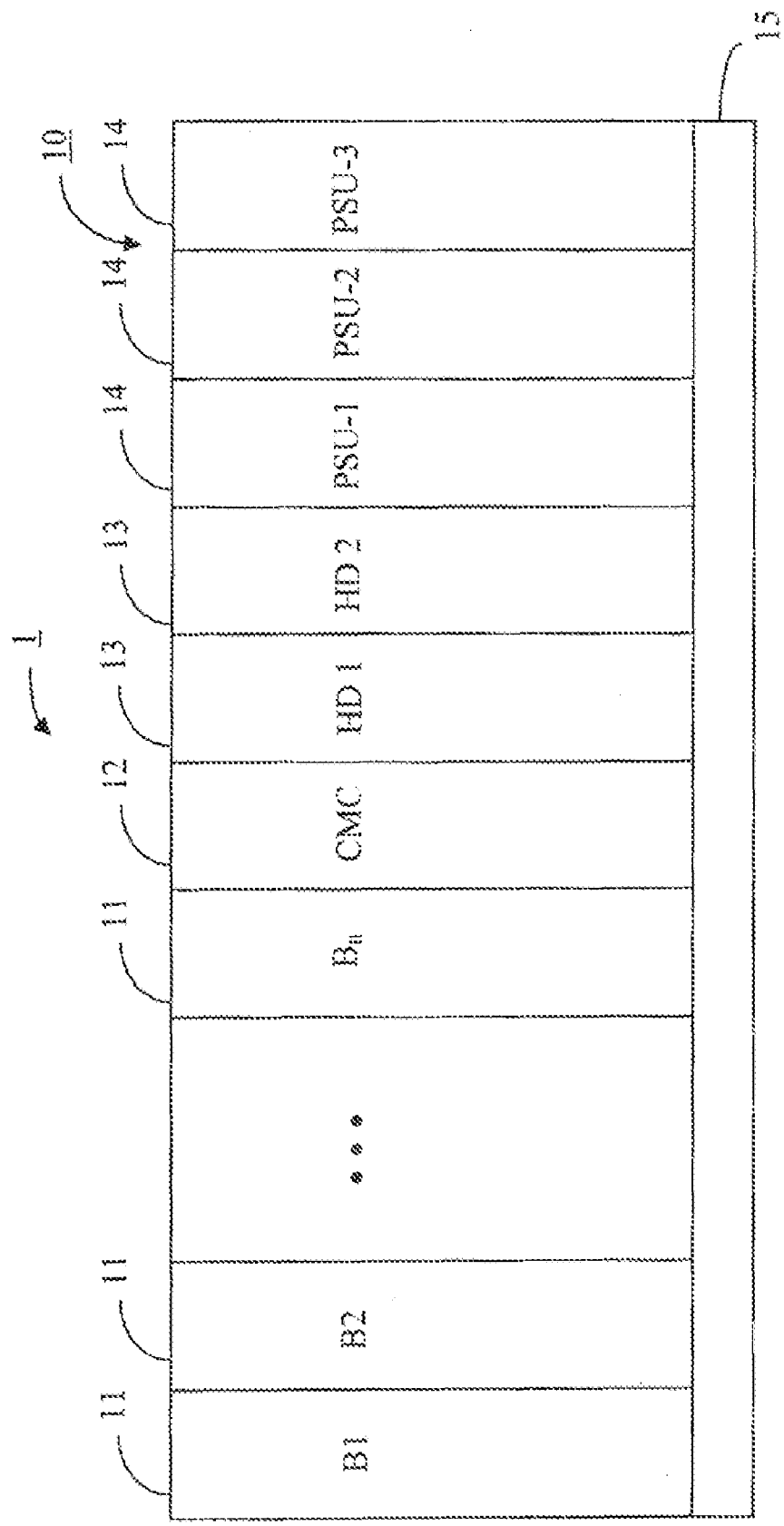
FIG. 1 is a schematic diagram depicting a non-limiting example of an information handling system such as a network server.

Referring to FIG. 1, in a non-limiting example, an information handling system 1 configured as a network server system is shown in a configuration comprising multiple server modules 11, also called blades. As used herein a network server system, also called a server system, may be one or more information handling systems that provides services to other information handling systems, also called clients, over a communication network. As used herein, the term server blade, also called blade, refers to a self-contained server designed for high density. A standard rack-mount server or a self standing server may contain all necessary components and need only a power cord and network cable to be functional. In contrast, server blades may have many components removed for space, power and other considerations while still having all the functional components for each blade to be considered an information handling system. A server blade, as used herein, may be an information handling system that is built on a card that plugs into a slot in a chassis 10. For example, chassis 10 may comprise numerous vertical slots having multiple server blades 11 plugged into the illustrated slots. Alternatively, chassis 10 may extend vertically and may have horizontal slots (not shown) into which blades may be inserted. A blade chassis may provide other services such as power, cooling, networking, disk storage, various interconnects and management that are shared by each blade. Server blades 11 may be considered modular information handling systems. A combination of server blades may also be considered an information handling system.

Chassis 10 may contain a backplane 15 with buses and/or communication lines interconnecting the slots in the rack. In addition, a chassis management controller 12 may be plugged into the rack for managing and monitoring the resources within the chassis, providing management warning or alerts, receiving management directives, and/or for performing other administrative functions associated with server blades 11. Chassis 10 may also contain many other types of components or modules, such as, for example, multiple shared power supplies 14, shared storage devices 13 containing hard disk drives, input/output (I/O) blades (not shown) for optical or other types of I/O, etc. Multiple chassis 10 may be configured in a vertical enclosure (not shown) for high density networking and/or computing applications.

Figure 2:
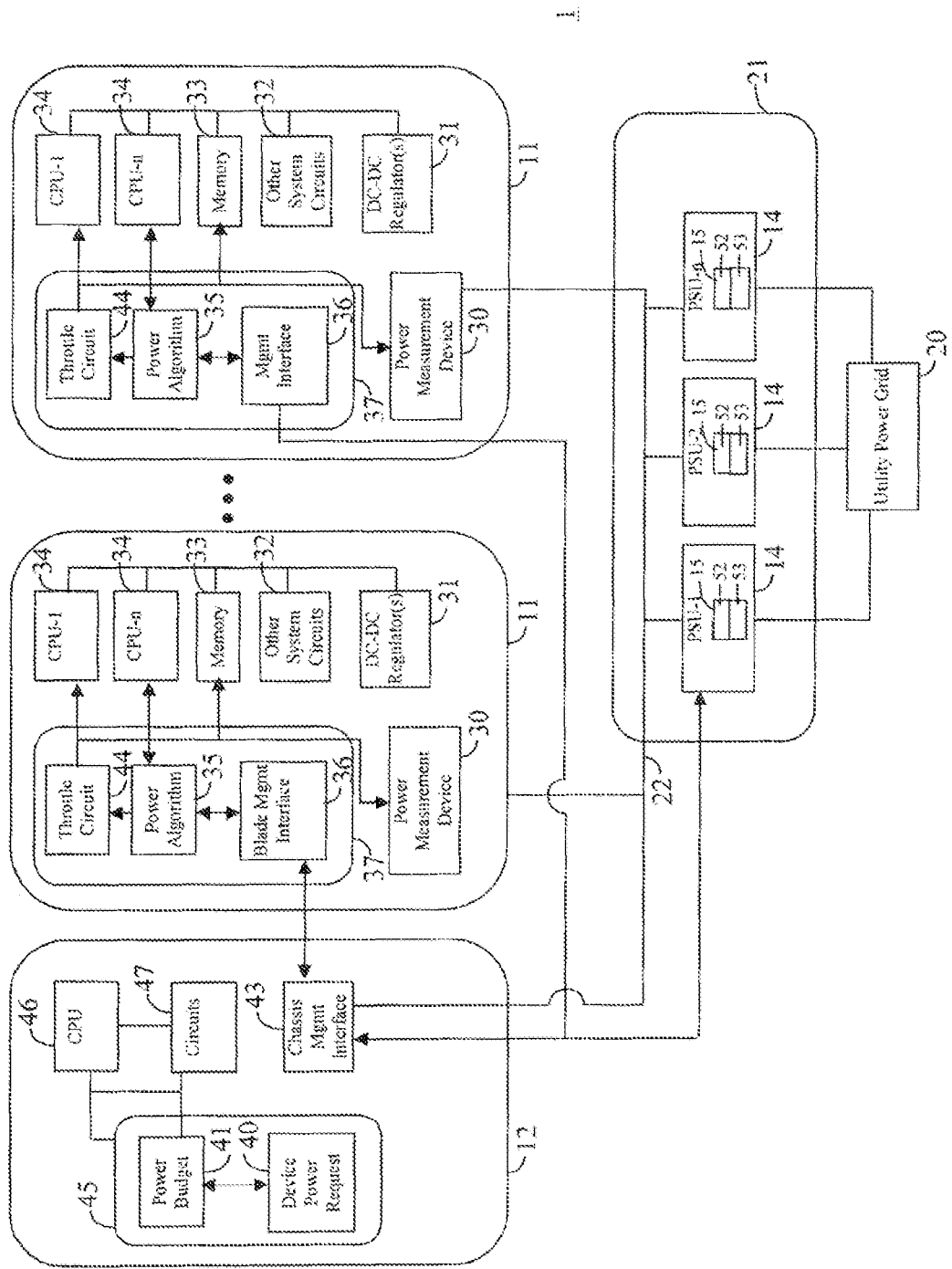
FIG. 2 is a block diagram depicting a non-limiting example of functional components of one embodiment of the information handling system of FIG. 1.

Referring additionally to FIG. 2, wherein a block diagram shows some of the functional components of one non-limiting embodiment of the network server of FIG. 1. The following discussion addresses the components and functions of a single blade 11 with the understanding that each blade 11 is similar. Power from a utility power grid 20 is connected to a parallel power supply subsystem 21. Power from utility power grid 20 may comprise AC power, DC power, or a combination of AC power and DC power. The power supply sub-system 21 converts the grid power to at least one appropriate DC voltage and supplies the DOC power to each of the various components, for example, server blades 11 and chassis management controller 12 via power bus 22. As shown, a plurality of power supplies 14 may be connected in parallel. Power supplies 14 may be intelligent power supplies comprising a power supply controller 15 having circuits and a processor 52 coupled to a memory 53 having data and instructions stored therein for controlling the operation of power supply 14. In one embodiment, power supply controller 15 may contain firmware having control instructions and data regarding the operation and load efficiency of power supply 14 using a known protocol. One such protocol may be the industry supported Power Supply Management Interface (PSMI), promulgated by the Server System Initiative, an industry initiative providing design specifications for common server hardware such as, "PSMI Design Guide Rev. 2.12—Power Supply Management Interface." Alternatively, it is intended that any suitable public or proprietary interface, now known or developed in the future, that provides suitable control functions and efficiency data may be used.

Power from power bus 22 passes through power sensor 30 on each blade 11 and is connected to DC-DC regulator 31. Power sensor 30 measures the actual consumed power on each blade 11. Any suitable power sensor may be used. It will be appreciated by one skilled in the art that each blade 11 may be used to process different processes and applications from each other blade 11. In such a case, each blade 11 may consume a different amount of power. Signals related to the power consumption measurement are transmitted to blade management controller 37 for use in controlling power allocated to each blade 11 as described below.

Each server blade 11 may comprise at least one CPU 34. Any suitable CPU may be used with the present invention. In one embodiment, multiple CPU's 34 may be resident on blade 11. Any number of CPU's 34 may be present on blade 11.

Memory 33 is resident on each blade 11 and may be in data communication with processors 34 resident on the same blade. Memory 33 may comprise volatile random access memory and/or nonvolatile memory. Other system circuits 32 may comprise electronic switches hardware monitoring circuits, and any other circuits required to maintain the health of blade 11.

Blade management controller 37 is resident on blade 11. Blade management controller 37 comprises circuits and firmware for controlling the management of the functions of the blade including a throttle circuit 44 for controlling processor operating speed. In addition, onboard blade power management is controlled through the use of programmed instructions including power algorithm 35. Also, communication between the blade and other devices, such as a chassis management controller 12 is controlled by blade management interface 36. Blade management controller 37 uses power algorithm 35 to monitor the power consumed and to indicate when additional power should be requested. For example, power consumption on a blade may be continually monitored using power sensor 30 to determine an average power consumption over a predetermined time interval. Alternatively, a maximum power consumption may be determined over the predetermined interval. Blade management controller 37 may also contain a throttle circuit 44 that may be used to throttle back CPU's 34 to a lower power usage by reducing the CPU clock rate. For example, consider the case where a blade detects an increase in usage that would cause power consumption to exceed the allocated power, with service factor. If the additional power is not available, allowing the blade to accept the higher usage may cause an over-current condition that may shut down a power supply. Such an occurrence may cascade through the system causing a catastrophic shutdown of the present system, and additional systems as they try to pick up the additional load. To obviate this occurrence, throttle circuit 44 immediately reduces the CPU clock rate and notifies blade management controller 37. Blade management controller 37, in turn, may request additional power from the chassis management controller 12. If additional power is available, the allocated power is increased for the device and the clock rate may be returned to its nominal value. Chassis management controller 12 comprises circuits 47, CPU 46, and memory 45 containing instructions for managing operational control of the various components installed in chassis 10, including but not limited to; server blades 11, power supplies 14, storage devices 13, and communications between the chassis 10 and other information handling systems. In one example, instructions in memory 45 may receive device power request 40, compare the request to the allocated system power budget 41 and modify the power allocated to various devices based on the instructions. Additional instructions stored in memory 45 will be discussed below.

In operation, the electrical power required to operate the system described above varies depending on the volume of computational and transactional tasks handled by the system. The power load may also vary by time of day. For example, a server handling brokerage transactions may see substantially more usage and require more power during the business day, but be lightly loaded at other times. It is possible to provide power as required and to maintain the providing power supplies at, or near their maximum operating efficiencies. Substantially all of the components associated with the server system 1 have known power consumptions. In order to operate efficiently, a power allocation budget is established using the rated power consumption of the various components in the system. A power allocation based on the rated power may be substantially greater than that actually consumed during average loading of the server system. During operation, power measurement sensor 30 provides information regarding the actual power consumed on each blade 11 to blade management controller 37 on each blade 11 as discussed previously. Blade management controller 37 controls the power allocation to each of the devices on blade 11 based on the power allocation from chassis management controller 12. The power consumption data is used by blade management controller 37 on each blade 11 to attempt to operate power supplies 14 efficiently. As described above, an average power consumption may be less than the allocated power resulting in an excess of power allocated to a particular device.

In one operating example, the power allocated to a device, such as blade 11 is adjusted by a safety factor such that the adjusted working power number is less than the initial allocation. For example, blade 11 requests, and is initially granted 500 watts by the chassis management controller 12. The blade management controller may multiply the allocated power by a safety factor, 0.9 for example, using 450 watts as the nominal blade working power figure and providing a 50 watt safety margin. The safety factor may range from 0.8-0.95. The safety margin provides a power buffer to help eliminate power surges from exceeding allocated power before remedial actions can be initiated. During operation, for example, if the actual power consumption detected exceeds the 450 watts then the blade will immediately throttle back and request additional power from chassis management controller 12. If the power is available, it will be allocated to blade 11. The amount of power requested, for example an additional 10%, will be added to the initial power allocation. In this example, the new power allocation is 550 watts and the new safety threshold is 495 watts with a safety margin of 55 watts. If the allocated power is still not sufficient, the request cycle may be repeated. In one embodiment, the amount of power requested may be made adaptively greater until sufficient power is allocated.

In another operating example, blade 11 requests additional power from chassis management controller 12. The additional power may not be available, considering the allocated power budget without turning on additional power supplies thereby lowering the average loading across the power supplies to a less efficient operating point. The chassis management controller will first poll the blade management controller 37 on each blade to determine if any of the blades are consuming less than their allocated power. If a particular blade is using less than its allocated power, chassis management controller 12 may request that the blade return a portion of the allocated power to the system power budget. For example, a second blade may be consuming an average of 300 watts of its allocated 500 watts. The chassis management controller allows the second blade to retain the average power multiplied by a service factor, 1.3 for example giving 390 watts and requests the remaining 110 watts be granted back to the system power budget. The service factor may be in the range of 1.1-1.35. Other situations may result in the chassis management controller requesting power back. For example, the chassis management controller may determine that the allocated power is causing more power supplies to be on than the actual draw of the chassis requires which reduces efficiency. The chassis management controller may request devices, such as blades 11, to lower their power allocations to a point where at least one power supply may be turned off thereby increasing the efficiency of the remaining activated power supplies.

Figure 3:
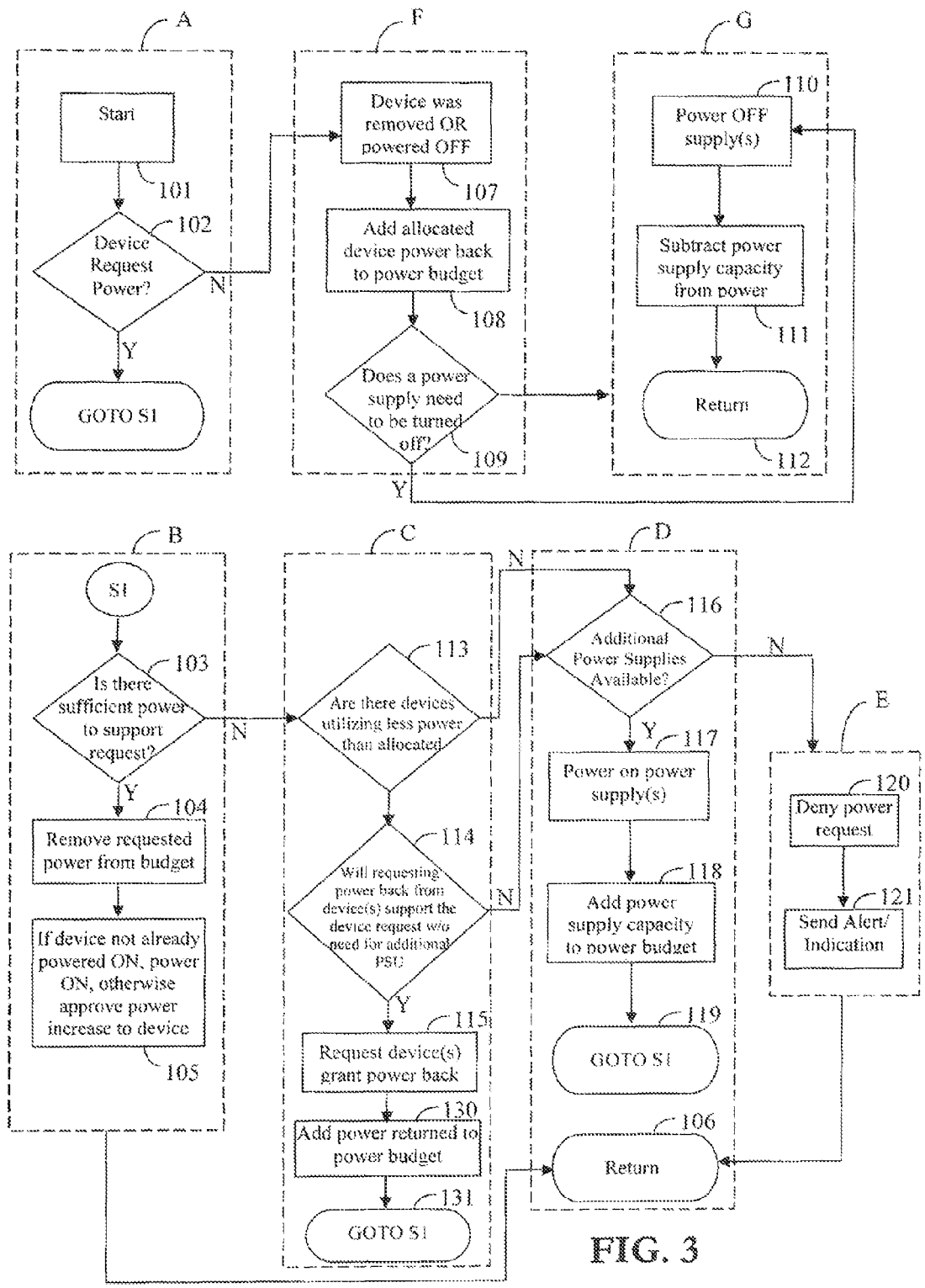
FIG. 3 is a flow chart depicting a non-limiting example of a method of managing power efficiency in a redundant power supply configuration in an information handling system.

Referring additionally to FIG. 3 a flowchart shows one non-limiting example of the present disclosure for efficiently managing and allocating power in an information handling system such as the server system described in FIGS. 1 and 2. The process has been broken into process sequences A-G. All sequences A-G start in logic block 101. In sequence A, a device, such as server blade 11 may experience a sudden increase in throughput load requiring more power. If the amount of power required is greater than the safety factor adjusted allocated power, blade management controller 37 on that particular blade 11, will request chassis management controller 12 to allocate more power to that particular blade 11 in logic block 102 and proceed to sequence B. In sequence B chassis management controller 12 receives the request for more power, compares the requested power to the allocated system power budget and determines if sufficient additional power is available from power supplies 14 in logic block 103. If sufficient power is available it is allocated to the device and the allocated power is removed from the overall available power budget. The process is returned to start in logic block 106 and awaits another change in load.

In sequence C, there is insufficient power available as determined in logic block 103. Chassis management controller 12 interrogates each device such as the other blades 11 and data storage devices 13 to determine if the actual measured power consumed by each device is less than the power presently allocated to the device in the allocated power budget in logic block 113. As discussed previously, each device may determine an average measured power consumed by the device. If less power is being consumed by a device, chassis management controller 12 evaluates in logic block 114 if the difference in power consumed versus power allocated, also called the excess power, will satisfy the power request from logic block 102 without the need for activating an additional power supply 14. If there is adequate power, without the need for additional power supply activation, the power is requested from the device in logic block 115. The power is returned to the power budget in logic block 130 and the sequence returned through 131 to logic block 103 to determine if this action satisfies the power request.

In sequence D, both the case where there are no devices utilizing less power than allocated to them in logic block 113, and the case where even with a difference in allocated versus actual power is not sufficient, the logic determines if additional power supplies are available in logic block 116. If there are power supplies available, they are activated, as required, in logic block 117. The additional power capacity is added to the overall power capacity budget in logic block 118 and the sequence returned through 119 to logic block 103 to determine if this action satisfies the power request. If the request is satisfied, the sequence moves along path B as indicated. If the request is not satisfied it branches back to sequence C again.

In sequence E, no additional power supplies are available. The power request is denied in logic block 121 and an alert/indication is sent to a management console (not shown) in logic block 122. Sequences B, C, D, and E are iteratively cycled in an attempt to maintain the activated power supplies at optimum efficiency.

Sequences F and G are directed to events where power requirements are significantly reduced by the removal or powering off of a device. Sequence F detects when a device is removed or powered off in logic block 107. The power allocated to such a device is added back to the system power budget. The logic then determines if turning off a power supply would improve the overall power efficiency. If turning off the power supply would not improve overall power efficiency, then the system is returned to Start in logic block 112. If turning off a supply would improve efficiency: a supply is turned off in logic block 110 and the power capacity of the deactivated supply is removed from the available system power budget in logic block 111. The system is returned to Start in logic block 112 and awaits another power request.

In another embodiment, the present disclosure may be embodied as a set of instructions on a computer readable medium comprising ROM, RAM, CD, DVD, hard drive, flash memory device, or any other computer readable medium, now known or unknown, that when executed causes an information handling system, for example information handling system 1, to implement a method of the present disclosure. For example, in one illustrative embodiment a computer readable medium contains a set of executable instructions that when executed by information handling system 1 performs a method for managing the power in information handling system 1. The method comprises executing a program such that hardware and firmware in information handling system 1 executes a logic sequence as illustrated in A-G as described above to manage the efficiency of power supplies in information handling system 1.

While described above with reference to modules having onboard processors, it is to be understood that the present disclosure encompasses hardware implementations in dedicated circuitry, sensors, and/or firmware that may be present on various chassis modules, such as disk storage modules, for determining and/or controlling the power distribution on such modules.

The above described system is described with respect to power supplies having efficiency data stored therein. It is intended that the present disclosure also encompass systems wherein power supply efficiency data of a predetermined power supply is stored in a memory in the server system such as in chassis management controller 12.

while various embodiments have been shown and described, various modifications and substitutions may be made thereto without departing from the scope of the disclosure. Accordingly, it is to be understood that the examples of this disclosure have been presented by way of illustrations and not limitation.

What is claimed is:

1. A method of controlling power supplies in an information handling system (IHS), comprising:
   receiving a power request from a first electrical device in the IHS, the IHS having a number of operating power supplies;
   determining if there is sufficient power to satisfy the power request;
   determining an excess power supplied to the IHS, wherein the excess power is the difference between an amount of power allocated to a plurality of electrical devices in the IHS compared to an amount of power consumed by the plurality of electrical devices by calculating an average power consumption of each device over a time period and multiplying the average power consumption by a service factor; and
   providing power to the first electrical device using only the number of operating power supplies if the excess power can satisfy the power request.

2. The method of claim 1 further comprising increasing the number of operating power supplies if the excess power cannot satisfy the power request.

3. The method of claim 1, further comprising requesting each of the electrical devices to grant an excess power back to an IHS power budget.

4. The method of claim 1, wherein the plurality of electrical devices comprises a plurality of network server blades.

5. The method of claim 4, further comprising reducing a central processing unit clock rate on at least one of the plurality of network server blades to avoid an over-current condition.

6. The method of claim 1, wherein data related to a load and an efficiency of the number of operating power supplies is stored in a memory, wherein the memory is chosen from the group consisting of a memory in the operating power supplies and a memory in a chassis management controller coupled to the IHS.

7. The method of claim 6, wherein the service factor comprises a range of 1.1 to 1.3.

8. An information handling system (IHS), comprising:
a plurality of electrical devices;
a number of operating power supplies electrically coupled to the plurality of electrical devices;
a chassis management controller coupled to the plurality of electrical devices and the number of operating power supplies, whereupon receiving a power request from a requesting device, the chassis management controller is configured to:
determine if there is sufficient power to satisfy the power request;
determine an excess power supplied to the plurality of electrical devices,
wherein the excess power is the difference between an amount of power allocated to the plurality of electrical devices compared to an amount of power consumed by the plurality of electrical devices multiplied by a service factor; and
direct only the number of operating power supplies to provide power to the requesting device if the excess power can satisfy the power request.

9. The information handling system of claim 8, wherein the chassis management controller is further configured to power on at least one additional power supply if the excess power cannot satisfy the power request.

10. The information handling system of claim 8, wherein each of the number of operating power supplies has a power supply controller comprising a processor coupled to a memory having a set of instructions stored therein for at least partially controlling the operation of the power supply.

11. The method of claim 1, wherein data related to a load and an efficiency of the number of operating power supplies is stored in a memory, wherein the memory is chosen from the group consisting of a memory in the power supplies and a memory in the chassis management controller coupled to the IHS.

12. The information handling system of claim 8, wherein the chassis management controller adjusts the number of operating power supplies such that each of the operating power supplies are loaded to maximize operating efficiency for each power supply.

13. The information handling system of claim 8, wherein the plurality of electrical devices comprise a plurality of modules.

14. The information handling system of claim 13 wherein the plurality of modules comprise server blades.

* * * * *